June 28, 1932.  L. O. KELLEY  1,865,015
SCALE MECHANISM
Filed April 20, 1931
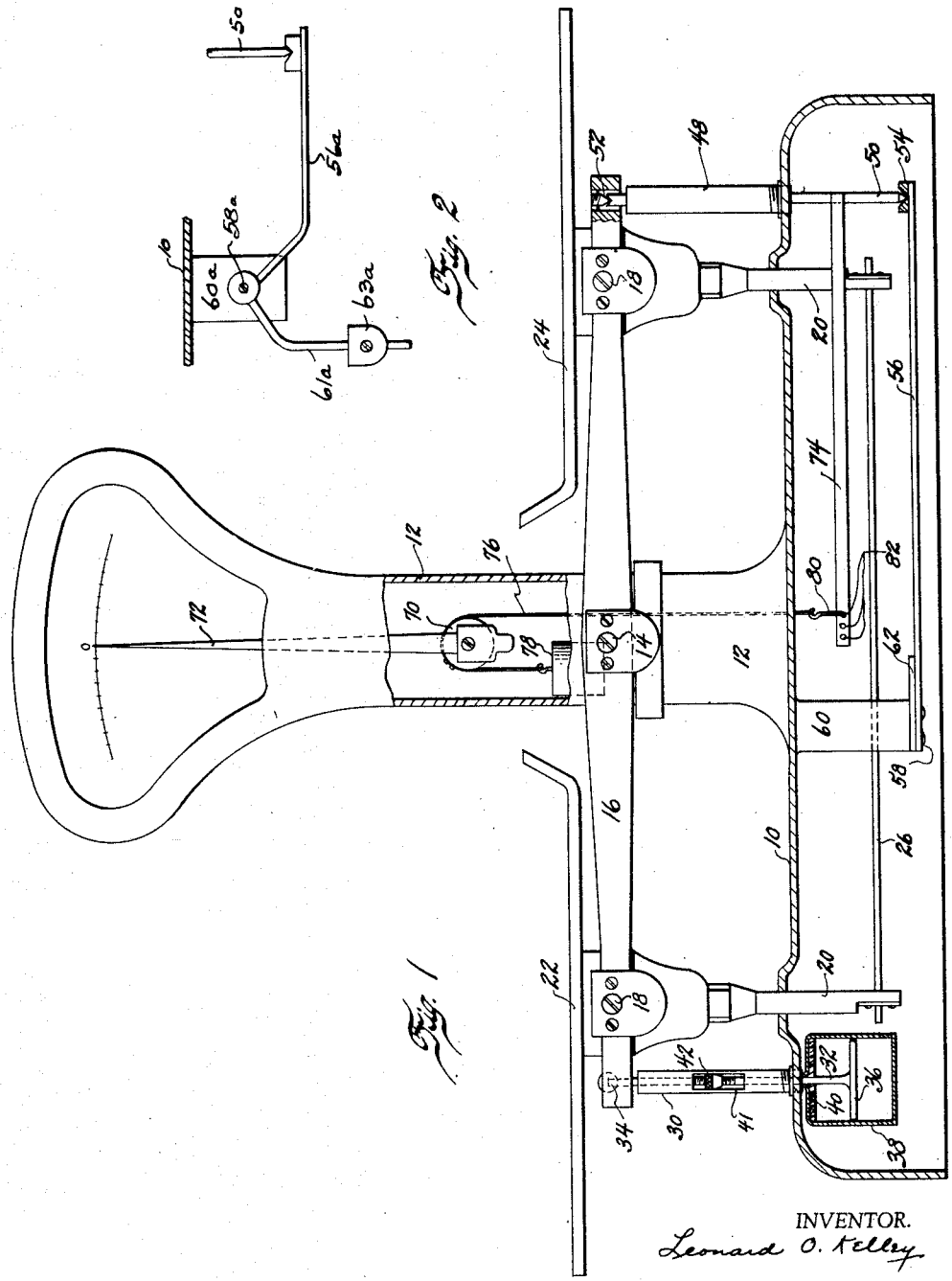
INVENTOR.
Leonard O. Kelley
BY
Francis D. Hardesty
ATTORNEY.

Patented June 28, 1932

1,865,015

UNITED STATES PATENT OFFICE

LEONARD O. KELLEY, OF DETROIT, MICHIGAN, ASSIGNOR TO THE STANDARD COMPUTING SCALE COMPANY, OF DETROIT, MICHIGAN, A CORPORATION OF MICHIGAN

SCALE MECHANISM

Application filed April 20, 1931. Serial No. 531,345.

This invention relates to balances of the predetermined weight type, and more particularly to checking or control devices therefor.

An object of the invention is a predetermined weight balance having resilient means to check the movement of the balancing parts.

A further object is a novel form of mounting and adjustment for a scale or balance dashpot.

A further object is a predetermined weight balance having an indicator, and means to multiply the action of the indicator in order to get a great reading in response to slight variations in load.

Still further objects will readily occur to those skilled in the art upon reference to the following description and the accompanying drawing in which The first figure on the drawing shows a balance in front view, parts being cut away.

The second figure shows a modified form.

As shown on the drawing, the scale includes a hollow base 10 having a hollow upright column or pedestal 12 mounted thereon. Pivotally secured to the pedestal, at 14, is a weighing lever 16 to the end portions of which, at 18, are pivotally secured the upright stems 20, one of these supporting a pan 22 upon which weights are to be placed, and the other supporting a pan 24 upon which the load is to be placed. A check rod 26 connects the lower ends of the stems 20 to maintain the pans 22 and 24 in operative position.

The construction thus far described is conventional and common to most scales of the predetermined weight type, and per se, forms no part of the invention of this case, the latter being directed to the combination of the foregoing with the hereinafter described indicator and means to control the operation of the scale when a load is placed upon the load pans.

Near one end of the base and threadedly secured thereto is a sleeve 30 surrounding a two piece rod 32, the latter being connected to one end of the lever 16 by a pivotal connection 34. The lower end of the rod is provided with a piston 36 slidable in an oil containing cylinder 38 suitably supported, as on an arm 40 fixed to the scale base 10 and passing through the cylinder 38, and provides a dashpot for the lever. Adjustment of the rod 32 is made possible by providing an opening 41 in the sleeve 30 giving access to the rod adjusting nut 42.

Near the other end of the base and also threadedly connected thereto is a second sleeve 48 surrounding a rod 50 connected at its upper end to the end of lever 16, by a pivotal or floating cone point connection 52. The lower end of the rod is pointed, and is seated or floated within the coned bearing 54 secured to one end of the spring arm 56, the latter being anchored at its other end 58 to a lug 60 formed as part of and integral with the base 10. The spring arm 56 is provided with a bimetallic thermostat or warping element 62 and forms a check or control for load pan 24, the position of the latter being affected by the warping of element 62 and the consequent movement of arm 56, fixed thereto.

Indicator mechanism is provided, the same including a drum 70 journalled in the pedestal 12 and provided with a pointer 72. The drum is connected to an arm 74 welded or otherwise rigidly secured to the rod 50, by a ribbon 76 having a weight 78 on one end, and a connection hook 80 on the other, the arm 74 having a plurality of (three) hook receiving holes 82 in a selected one of which the hook 80 is disposed.

The operation of the scale is as follows: When a weight is placed on the weight pan 22, the load pan 24 and the rod 50 will be elevated, the spring arm 56 being all the while in contact with the rod. At the same time pointer 72 will be on the minus side of the zero mark. Load is applied to the pan 24 and when the load balances the weight exactly, the indicator pointer will read zero.

It will be seen that spring arm 56 will effectively act to check the drop of rod 50 and to check the swing of the pointer.

Further, since band 76 is connected to the outer end of lever 16, a greater multiplying effect, for pointer 70 will result, than would be the case if the band were connected to lever 16 near the pivot 14.

Further leverage distance on the load side may be made slightly greater than that on the weight side, in order to compensate for the extra resistance of the spring 56 and the weight 78, tho such construction need not be used, if the scale be calibrated to compensate for these parts.

In Fig. 2 there is shown a form in which the spring arm 56 is replaced by a lever arm 56a pivotally secured at 58a to the base part 60a, there being a pendulum arm 61a provided with an adjustably mounted pendulum weight 63a. It will be understood that this construction is the full equivalent of the one of Fig. 1, and the claims are to be considered with this in mind.

It will also be seen that if the pedestal 12 is rotated on its own vertical axis so as to occupy a different position from the one it is now shown as occupying, the hook 80 may be passed thru a different one of the holes 82 to compensate for the change of position of the drum and the band 76.

Further, the free end of the arm 74 may be guided in a suitably slotted member, not shown, if desired, the latter having been omitted for purposes of clarity.

Further, tho no counterpoise means for the balance is shown, it will be obvious that a suitable counterpoise may be provided, if desired.

Now having described the invention and the preferred embodiment thereof, it is to be understood that the said invention is to be limited, not to the specific details herein set forth, but only by the scope of the claims which follow.

What I claim is:

1. In a balance having a weight pan, a load pan, a lever connecting the pans, a resilient arm operatively connected to the load pan to check the movement thereof, and an indicator pointer operatively connected to the end of said lever by an adjustable connecting means.

2. In a balance having a base and an upright pedestal, a weighing lever pivoted on said pedestal and having a weight pan on one end and a load pan on the other, a rod having its upper end operatively connected to the lever, and a resilient arm secured at one end to the base and upon the other end of which the lower end of the rod floats, the arm acting thru the rod to check the movement of the weight pan.

3. In a balance having a base and an upright pedestal, a weighing lever pivoted on said pedestal and having a weight pan on one end and a load pan on the other, a rod having its upper end operatively connected to the lever, and a resilient arm secured at one end to the base and upon the other end of which the lower end of the rod floats, the arm acting thru the rod to check the movement of the weight pan, and indicator means operatively connected to the end of said lever near the load pan, said means including a drum journalled in the pedestal, a band passed over said drum and having a weight on one end, an arm rigidly secured to said rod and connected to the free end of the band, and an indicator on said drum.

4. In a balance having a base and an upright pedestal, a weighing lever pivoted on said pedestal and having a weight pan on one end and a load pan on the other, a rod having its upper end operatively connected to the lever, and a resilient arm secured at one end to the base and upon the other end of which the lower end of the rod floats, the arm acting thru the rod to check the movement of the weight pan, and indicator means operatively connected to the end of said lever near the load pan, said means including a drum journalled in the pedestal, a band passed over said drum and having a weight on one end, an arm rigidly secured to said rod and connected to the free end of the band, and an indicator on said drum, the connection between the band end and the arm including a plurality of connecting means any one of which may be selected to conform to the position of the pedestal with respect to the base.

5. In a balance having a weight pan, a load pan, a lever connecting the pans, a pedestal between the pans, a drum journalled in said pedestal, a band passed over said drum and having a weight on one end, the other end of the band being connected to the end of the lever near the load pan, and an indicator on said drum, the connecting means including a rod secured to said lever end, an arm rigidly secured to said rod, and to which the band end is secured.

6. In a weighing device, the combination of a base, a sleeve secured to said base, a dashpot rod in said sleeve, and having an adjusting nut thereon, the sleeve having an opening in its wall to expose the nut for manipulation.

7. In a scale, a base, a pedestal, indicating means in said pedestal, a weighing part in said base, and a band connecting said part to said indicating means, the connection including a number of duplicate parts, a desired one of which may be selected as the particular means employed, depending upon the position of the pedestal with respect to the base.

8. In a balance having a weight pan, a load pan, a lever connecting the pans and pivotally mounted between its ends, a resilient arm fixedly mounted at one end and at its other operatively connected to the load pan to check the movement thereof, and an indicator pointer operatively connected to the end of said lever by an adjustable connecting means.

9. In a balance having a base and an upright pedestal, a weighing lever pivoted on said pedestal and having a weight pan on one end and a load pan on the other, a rod having its upper end operatively connected to the lever, and a resilient arm secured at one end to the base and upon the other end of which the lower end of the rod floats, the arm acting thru the rod to check the movement of the weight pan, and an indicator pointer operatively connected to the end of said lever by an adjustable connecting means.

10. In a balance having a weight pan, a load pan, a lever connecting the pans, means operatively connected to the load pan and comprising a pivotally mounted pendulum operated arm to check the movement thereof, and an indicator pointer operatively connected to the end of said lever by an adjustable connecting means.

11. In a balance having a weight pan, a load pan, a lever connecting the pans, means operatively connected to the load pan by a vertical rod and comprising a pivotally mounted pendulum operated arm to check the movement thereof, and an indicator pointer operatively connected to the end of said lever by an adjustable connecting means.

In testimony whereof, I sign this specification.

LEONARD O. KELLEY.